April 4, 1961 W. T. HARRIS 2,978,648

HIGH FREQUENCY TRANSDUCERS

Filed Nov. 21, 1957

2 Sheets-Sheet 1

INVENTOR.
WILBUR T. HARRIS

BY Mitchell & Bechert

ATTORNEYS

April 4, 1961 W. T. HARRIS 2,978,648

HIGH FREQUENCY TRANSDUCERS

Filed Nov. 21, 1957

2 Sheets-Sheet 2

INVENTOR.
WILBUR T. HARRIS
BY Mitchell & Bechert
ATTORNEYS 2,978,648
Patented Apr. 4, 1961

2,978,648

HIGH FREQUENCY TRANSDUCERS

Wilbur T. Harris, Southbury, Conn., assignor to The Harris Transducer Corporation, Woodbury, Conn., a corporation of Connecticut Filed Nov. 21, 1957, Ser. No. 697,817
15 Claims. (Cl. 330—10)

This invention relates to circuit-element transducers, and more particularly to magnetostrictive circuit elements wherein mechanically resonant properties determine electrical performance and properties.

The usual configuration of a magnetostrictive vibrator is a coil of wire coupled to a magnetostrictive core member, the coil being connected to a source of alternating current so as to subject the magnetostrictive member to an alternating magnetic field. Since the coil and core absorb energy from the source, the combination can be considered as an impedance, and since this absorption of energy is a function of the excitation frequency, the impedance is frequency-dependent. In fact, as the frequency of excitation approaches the mechanically resonant frequency of the magnetostrictive member, the impedance acts similarly to capacitor, resistor, and inductor elements in parallel in the region of resonance, that is, there is a steep increase in the magnitude of the impedance. This behavior is due to the vibratory mechanical motion of the magnetostrictive core and its interaction with the electrical circuit. As the excitation frequency is increased beyond the mechanically resonant frequency, the impedance exhibits an equally abrupt decrease in magnitude.

Although impedance networks comprising inductors and capacitors have been constructed for filtering electrical signals, these networks are not satisfactory for many applications. The change in impedance about the resonant frequency is not abrupt enough. Thus, the frequency band is not sharply defined. Magnetostrictive impedance elements, however, may present more abrupt changes and are therefore more attractive when very precise filtering is required. Also, magnetostrictive impedances offer advantages in size, weight, and manufacturing techniques over pure resistance, capacitance, inductance (R, C, L) impedances, as indicated in what follows.

Unfortunately, known magnetostrictive impedance elements are usually relatively large and difficult to assemble, and they are limited to operation over a range of relatively low frequencies.

It is, accordingly, an object of one aspect of the invention to provide improved magnetostrictive impedance elements.

It is another object of this aspect of the invention to provide improved magnetostrictive impedance elements which are suitable for microminiature applications.

It is a still further object of the invention to provide magnetostrictive impedance elements operative to the megacycle region.

It is an object of another aspect of the invention to provide a variable impedance device lending itself to employment as a microminiature modulator or amplifier.

It is a general object to meet the above objects with an improved variable impedance device which is small, compact, rugged and has theoretically long life, and great stability.

Other objects and various further features of novelty and invention will be pointed out or will occur to those skilled in the art, from a reading of the following specification in conjunction with the accompanying drawings. In said drawings, which show, for illustrative purposes only, preferred forms of the invention:

Fig. 1*a* shows a cut-away perspective view of a magnetostrictive impedance element according to one embodiment of the invention;

Fig. 1*b* is a symbolic representation of the magnetostrictive impedance element of Fig. 1*a*;

Briefly, in accordance with one aspect of the invention, I provide a class of impedance element which includes a wound core comprising a ferromagnetic ring or a stack of similar rings having magnetostrictive properties. For very high frequency response, the ring or rings are of very small physical proportions, and in order to derive high-Q performance at such frequencies, the winding is coupled to the core in essentially mechanically free relation therewith.

In addition to filter applications, this class of magnetostrictive elements has useful application in modulators and other circuits. Whenever the magnetostrictive element is excited at a given frequency, the magnitude of the impedance is a function of the magnitude of the magnetic polarization in the magnetostrictive core. Polarization may be achieved by using a permanently polarized core, or it may be induced externally by a permanent magnet or by a winding (which may be the signal winding) connected to a current source. Thus, a modulator using a magnetostrictive impedance element may be constructed wherein the modulating signal controls the polarization of the magnetostrictive material, the carrier signal being applied at the mechanically resonant frequency of the transducer. In particular, if the carrier signal is from a high-impedance source, a quasi-constant current is fed to the transducer, the carrier signal voltage developed will be substantially proportional to the transducer impedance, which is readily controlled by the polarizing or modulating signal current. Thus, there results a modulator-amplifier which may have high gain, it being noted that the amplitude of the signal developed is usually greater than the amplitude of the modulating signal. By detecting the developed signal, the overall circuit functions as an amplifier of the modulating signal.

Figure 1A:
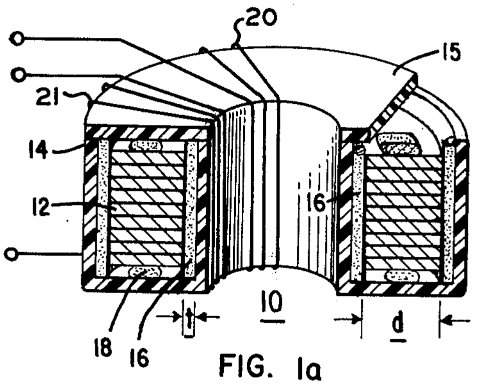
Figure 1B:
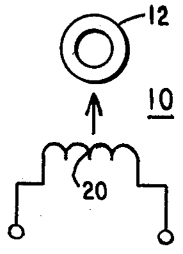

Referring to Fig. 1, a magnetostrictive impedance element according to one embodiment of the invention is shown to comprise a plurality of rings 12 of magnetostrictive material stacked within a toroidal casing 14 of a non-magnetic non-conductive material and cushioned from the toroidal casing 14 by buffers 16—18 of a resilient material; the buffers 16—18, which may be "crumbs" of silicone sponge, are preferably few in number and are carefully positioned and secured within the casing 14 to provide essentially mechanically free and independent suspension of the rings 12, the buffers 16 being shown as angularly spaced resilient ribs or ridges between the rings 12 and the radially inner wall of the casing 14. The casing is shown to be formed of an annular cup-shaped member 14 and an annular closure piece 15 bonded thereto. Winding means 20 is toroidally wound about the casing 14 for connection to one or more signal sources (not shown), depending on the application of the device. Although for many applications, only one winding is needed, I have shown the two windings 20—21.

The magnetostrictive rings 12 may be permanently polarized, or a second winding coupled to a direct-current source may be toroidally wound about the casing 14 to establish polarization in the rings 12; alternatively, polarizing current may be superposed on the signal current, for application to the single winding 20. Polarizing current may be used in combination with permanent or residual polarization also. When an alternating-current excitation signal is applied to the winding 20, magnetostrictive action is manifested by radial vibration in each of the rings. Whenever the frequency of the excitation signal approaches the mechanically resonant frequency of the magnetostrictive rings, there is a sharp rise in the impedance of the magnetostrictive impedance element 10.

The rings 12 may be magnetostrictive ferrite heads or rings and may be permanently magnetized or not; alternatively, stamped washers of magnetostrictive sheet material, such as nickel, may be employed, again permanently magnetized or not. For a given magnetostrictive material, the size of the rings 12 is determined by the range of frequencies being handled, since the mechanically resonant frequency of the rings 12 is a function of their mass, dimensions and elasticity. It should be noted that when employing ferrite rings 12, there is no problem with eddy-current losses which would blunt the sharpness of impedance rise near mechanical resonance. However, ferromagnetic alloys are subject to eddy currents and, therefore, the thickness of stamped washers should be chosen to minimize these losses. Usually, they must be very thin.

In general, as the range of operative frequencies rises, the diameter of the core rings 12 must be decreased. At lower frequencies, washers of magnetostrictive sheet may be slightly bonded on their edges, as by applying a light coating of epoxy resin after preliminary assembly of the core stack. At high frequencies, above about two hundred kilocycles per second, the magnetostrictive rings 12 are preferably free (no bonding), and the buffers may be omitted; for the higher frequencies, dimensions are so small that bonding is not needed for adequate mechanical retention, and the absence of bonding minimizes additional mechanically resonant modes.

Although the diameter of the rings is determined by the frequency range, the ratio of the dimension $d$ (radial thickness of rings 12) to the dimension $t$ (inner radial clearance of ring 12 to casing 14) must be large. For example, in one particular element in which the rings 12 have an outside diameter of approximately 0.250 in. and an inside diameter of 0.125 in., the clearance dimention $t$ is in the order of 0.010 in.; for this situation, mechanical resonance occurs at about 320 kc./s. For a winding 20 or 40 turns of #33 wire, the electrical impedance at resonance is in the order of 225 ohms and decreases to seven tenths of this value in about three kilocycles (i.e. 317 kc./s. or 323 kc./s.

Figures 2, 3:
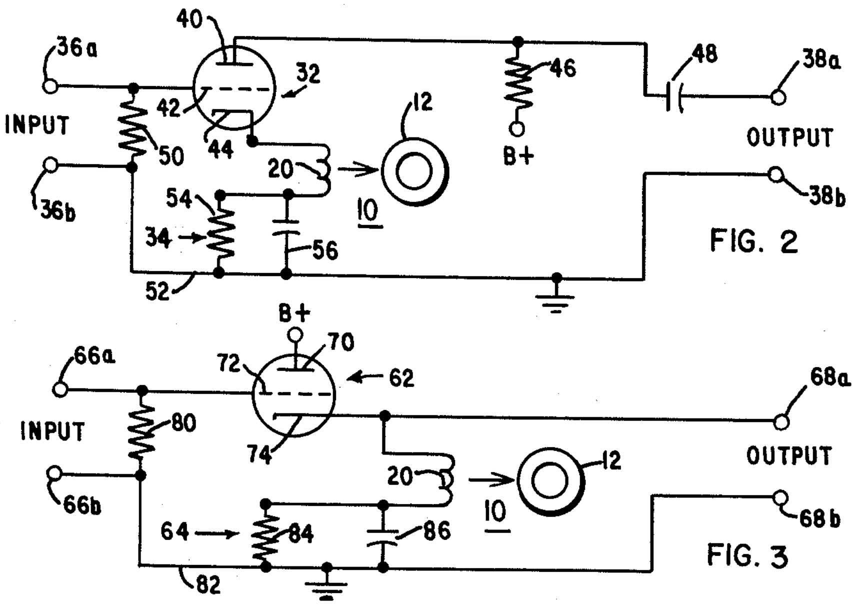
Fig. 2 is a schematic diagram of a band-reject filter employing the magnetostrictive impedance element of Fig. 1.
Fig. 3 is a schematic diagram of a band-pass filter employing the magnetostrictive impedance element of Fig. 1.

Fig. 2 shows the use of the magnetostrictive impedance element in a band-reject filter. The band re-ject filter 30 comprises a triode vacuum tube 32, with the magnetostrictive impedance element 10 (using the symbolism of Fig. 1*b*) and a parallel RC combination 34 disposed serially in the cathode circuit 44 of tube 32. When a periodically varying signal having a frequency removed from the mechanically resonant frequency of the magnetostrictive impedance element 10 is impressed across the input terminals 36(*a–b*), the signal is amplified and transmitted from the output terminals 38(*a–b*). However, when the impressed signal has a frequency near the mechanically resonant frequency, the impedance of the element 10 becomes large and the cathode circuit 44 becomes highly degenerative, and little or no signal is transmitted from the output terminals 38.

The anode 40 of tube 32 is shown coupled via a resistor 46 to the B-supply, and via a coupling capacitor 48 to the output terminal **38*a*. The control grid 42 is connected to the junction of the input terminal 36*a* and one end of the resistor 50, the other end of which is coupled to the junction of the input terminal 36*b* and the grounded reference line 52. The magnetostrictive impedance element 10 is connected at one end to the cathode 44 and at the other end to one end of the parallel RC circuit 34, the other end of which is connected to the grounded reference line 52**.

At frequencies removed from mechanical resonance, the magnetostrictive impedance element 10 is generally quiescent and acts as a short circuit between the cathode 44 and the parallel RC combination 34, thus permitting the resistor 54 to establish a bias for the triode vacuum tube 32. This means that for input signals at 36(*a–b*) having frequencies removed from the mechanically resonant frequency, the impedance of the cathode circuit remains small, and amplification of the input signals is permitted. However, when the input signal includes frequencies approaching the mechanically resonant frequency, the impedance of the magnetostrictive impedance element 10 sharply rises, greatly increasing the bias on the tube 32, greatly diminishing the amplification, and therefore only transmitting a very weak signal from the output terminals 38.

Thus, if the input signal sweeps through a spectrum of frequencies spanning the mechanically resonant frequency, the output signals will show a notch in the region of the mechanically resonant frequency. In other words, all signals having frequencies removed from the mechanically resonant frequency are amplified and transmitted, and those frequencies within a small band about the mechanically resonant frequency are rejected.

It should be noted that although a triode vacuum tube is shown as the amplifying element, other multigrid vacuum tubes or transistors may be conveniently used. When substituting a transistor, the serially disposed magnetostrictive impedance element 10 and parallel RC combination 34 are connected either to the base or to the collector of the transistor, as will be understood.

Fig. 3 shows the use of the magnetostrictive impedance element in a band-pass filter. The band-pass filter may again comprise a triode vacuum tube 62 with the magnetostrictive impedance element 10 and the parallel RC combination 64 disposed serially in its cathode circuit; however, output is taken at terminals 68(*a–b*) across the cathode circuit. When a periodically varying input signal having a frequency removed from the mechanically resonant frequency of the magnetostrictive impedance element 10 is impressed across the input terminals 66, very little signal is transmitted from the output terminals 68; however, when the impressed signal has a frequency near the mechanically resonant frequency, a relatively large signal is transmitted from the output terminals 68.

The anode 70 of tube 62 is connected to the B-supply. The control grid 72 is connected to the junction of the input terminal **66*a* and one end of input resistor 80, the other end of which is coupled to the junction of the input terminal 66*b* and the grounded reference line 82. The cathode 74 is connected to the junction of the output terminal 68*a* and one end of the magnetostrictive impedance element 10, the other end of which is connected to one end of the parallel RC combination 64. The other end of the parallel RC combination 64, comprising the resistor 84 and the capacitor 86, is connected to the junction of the reference line 82 and the output terminal 68*b***.

As described for the case of Fig. 2, and at frequencies removed from the mechanically resonant frequency, impedance element 10 is quiescent and acts as a near short circuit between the cathode 74 and the parallel RC combination 64, permitting the resistor 84 to establish an operating bias for the triode vacuum tube 82. In the presence of input signals having frequencies removed from the mechanically resonant frequency, the impedance of the cathode circuit remains low, and hardly any signal is developed across the output terminals 68 connected across this impedance. For input signals having frequencies approaching the mechanically resonant frequency, the impedance of the magnetostrictive impedance element 10 sharply rises, permitting the development of a voltage across the output terminals 68.

Thus, if the input signal sweeps through a spectrum of frequencies starting much below the mechanically resonant frequency and ending far above the mechanically resonant frequency, the output signals will only be from a band in the region of the mechanically resonant frequency. In other words, the circuit will pass essentially only those frequencies in a small band near the mechanically resonant frequency.

It should again be noted that, although a triode vacuume tube is shown, other multigrid vacuum tubes or transistors may be used as the amplifying element. When employing a transistor, the serially disposed magnetostrictive impedance element 10 and the parallel RC combination 64 is connected either to the base or to the collector of the transistor, as will be understood.

Figure 4:
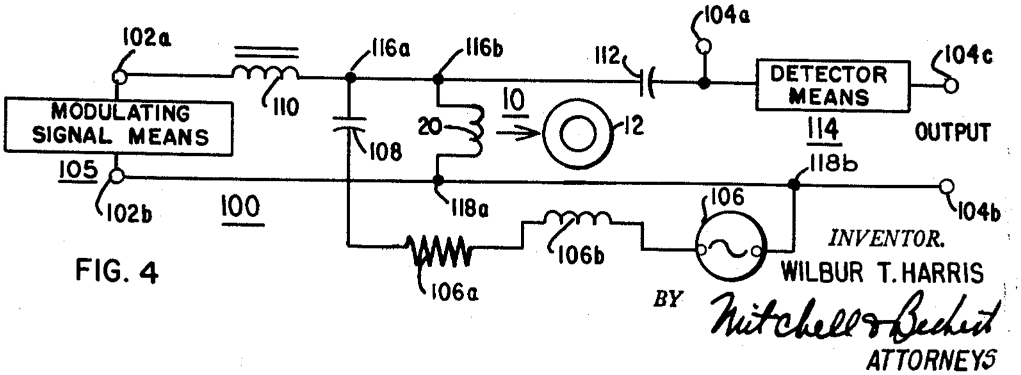
Fig. 4 is a schematic diagram of a modulating amplifier employing the magnetostrictive element of Fig. 1.

Fig. 4 shows a modulator employing a magnetostrictive impedance element 10 having the winding 20. The winding 20 is coupled via the junctions **116*b* and 118*a* and the inductance 110 (acting as a high-frequency choke) to the terminals 102**(*a–b*) of the modulating signal means 105. The carrier frequency signal source 106, having a high source impedance (as shown by the resistor **106*a* and the inductor 160*b* in series with the generator), is coupled via the capacitor 108 (a direct-current blocking capacitor) to the junction 116*a* and to the junction 118*b*. Thus, the modulating signal is superimposed on the carrier signal, and both are fed to the magnetostrictive impedance element 10**.

It should be noted that the carrier signal is from a high-impedance source so that a relatively constant current is supplied to the magnetostrictive impedance element 10. Thus, as the impedance of the magnetostrictive impedance element 10 changes, the voltage developed across the terminals 116 and 118 correspondingly changes.

The frequency of oscillation of the carrier source 106 is chosen close to the mechanically resonant frequency of the magnetostrictive impedance element 10. Thus, as far as frequency-dependence is concerned, the impedance is near its maximum value. However, as has heretofore been explained, the impedance in the resonant-frequency range is a function of the degree of polarization in the magnetostrictive impedance element. As the polarization increase, the impedance and phase angle may change. In the absence of polarization, the impedance is low since no resonant vibration is excited.

The modulating signal should originate from a source having a source impedance of less than one-hundredth of the impedance which the magnetostrictive impedance element presents to carrier at full polarization. Also, the frequencies of the modulating signal should preferably lie between D.-C. and about one tenth of the carrier frequency.

At zero-amplitude modulating signal input, there is substantially no modulated carrier signal output. As the modulating signal increases in amplitude, the impedance of the magnetostrictive impedance element 10 increases; and, since the carrier signal current is constant, the voltage developed across the terminals 116 and 118 increases. A decrease in modulating signal amplitude produces a related decrease in impedance and voltage. Thus, the carrier signal is modulated by the modulating signal.

It should be noted that although an inductance 110 is employed to prevent the carrier signal from entering the low-impedance modulating-signal means, a suitable low-pass filter may also be employed. In fact, the inductor 110 can be replaced by a second magnetostrictive impedance element with the same resonant frequency as the magnetostrictive impedance element 10.

It should also be noted that even though the modulating signal and the carrier signal are superimposed and fed to the single winding 20, two windings could be employed. One winding (e.g. winding 20) is responsive to the carrier signal source 106, and the other winding (e.g. winding 21) is responsive to the modulating-signal source.

It should be further noted that the modulator is actually a modulator-amplifier. The maximum power gain between modulating-signal input and modulated-carrier output approaches the ratio between the impedance at optimum polarization to the impedance at no polarization.

Since there is an amplified signal output, the detection of the modulated carrier signal yields an amplified output signal. Therefore, by connecting a detector 114 (of conventional form) to the output terminal **104*a*, amplifier action is obtained at output terminals 104**(*b–c*).

Alternatively, the magnetostrictive impedance element may be employed in one arm of an impedance bridge, operating near balance, to provide a bridge-type modulator. In such an embodiment, the carrier signal and the modulating signal are fed to a pair of terminals of the bridge while the modulated signal is transmitted from a conjugate pair of terminals. The carrier signal has a frequency approximately equal the mechanical resonant frequency of the magnetostrictive impedance element. Thus, a varying amplitude signal from a modulating signal source affects both the amplitude and phase angle of the impedance presented to the bridge by the arm containing the magnetostrictive impedance element.

Figure 5:
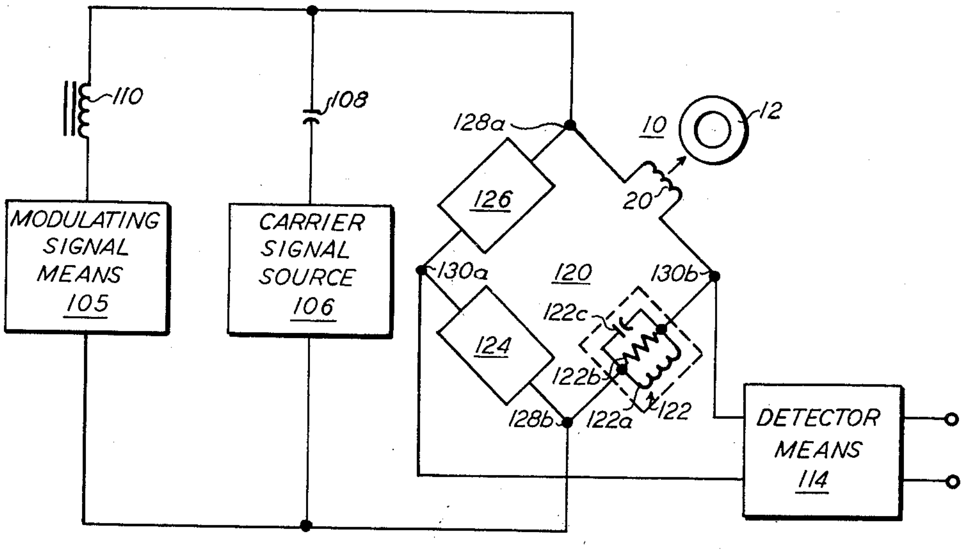
Fig. 5 is a schematic diagram for a bridge-type modulating amplifier employing the magnetostrictive impedance element in one arm.

Accordingly, Fig. 5 shows a bridge-type modulator comprising an impedance bridge 120 having a magnetostrictive impedance element 10. A modulating signal means 105 and a carrier signal source 106 are coupled to the input terminals 128(*a–b*) of the impedance bridge 120, while a detector means 114 may be coupled to its output terminals 130(*a–b*). With the impedance bridge initially adjusted near balance by a suitable choice of the impedances in the remaining arms, impedance variations in the magnetostrictive impedance element cause the transmission of a varying amplitude signal having a frequency equal to the carrier frequency. The impedance of the magnetostrictive impedance element is caused to vary in response to signal developed by the superposition of the modulating signal on the carrier signal.

The impedance bridge 120 includes a first arm employing a magnetostrictive impedance element 20 connected between the input terminal **128*a* and the output terminal 130*b*, a second arm with an impedance 122 connected between the output terminal 130*b* and the input terminal 128*b*, a third arm having an impedance 124 connected between the input terminal 128*b* and the output terminal 130*a*, and a fourth arm having an impedance 126 connected between the output terminal 130*a* and the input terminal 128*a*. In order to obtain a good balance at a reference level of polarization in the magnetostrictive impedance element 20 for the frequency of the carrier signal source, the impedance 122 is developed from the parallel disposed inductor 122*a*, resistor 122*b*, and the capacitor 122*c*. The values of these elements are chosen to match the impedance of the magnetostrictive impedance element 20. The impedances 124 and 126** may be either resistors, inductors or capacitors. Although resistors introduce no phase shifts, they are power-consuming elements which decrease the efficiency of the impedance bridge as a source of modulated carrier signals. However, by using suitably large capacitors, one of which is variable, no phase-shift complications are introduced and the A.-C. impedance of bridge is not increased. Capacitors are also advantageous when the apparatus is used as a direct-current amplifier or a very low frequency modulator or amplifier since direct current is blocked in one half of the impedance bridge.

The modulating signal means 105 is the same as that used in the embodiment of Fig. 4 and requires a low-pass filter such as the choke 110 to prevent carrier signals from entering its signal source. Similarly, the same carrier signal source 106 may be employed with a high-pass filter such as the capacitor 108.

Since, as has been described for the embodiment of Fig. 4, an amplified form of the modulating signal is included in the components of the transmitted signal, an amplified modulating signal is obtained by sensing the output of a detector means 114 coupled to the output terminals 130(*a–b*).

It should be realized that operation of the modulators and amplifiers relies on the change of electro-mechanical coupling co-efficient with polarization in magnetostrictive materials. This is in contradistinction from the conventional class of magnetic amplifiers wherein the operation relies on the change of permeability with polarization.

It will be seen that I have described an improved circuit-element construction, characterized by high-Q (sharp impedance transition) in the immediate vicinity of the frequency of mechanical resonance. The device is small, rugged, and applicable to very high frequency use. It lends itself readily to band-pass and band-reject filter applications, and is inherently applicable as a high-gain modulating element.

While the invention has been described in detail in connection with the preferred forms illustrated, it will be understood that modifications may be made within the scope of the invention as defined in the claims which follow.

I claim:

1. An impedance element comprising a plurality of thin, flat magnetostrictive rings coaxially stacked upon one another, the dimensions of said rings being circumferentially uniform, a rigid casing having a correspondingly ring-shaped inner space within which said stack of rings is received with clearance therearound, means disposed within said clearance between and operatively connected to said rings and said casing to permit vibration of said rings relative to said casing, and an electrical winding on said casing and toroidally developed about said rings.

2. The impedance element of claim 1, in which said rings are resin-bonded to one another only at their edges.

3. An impedance element comprising a pluarlity of thin, flat magnetostrictive rings coaxially stacked upon one another, the dimensions of said rings being circumferentially uniform, a rigid casing having a correspondingly ring-shaped inner space within which said stack of rings is received with clearance therearound, said rings being alike and each having a radial thickness several times greater than their axial thickness and many times greater than the radial clearance between said rings and said casing, and an electrical winding on said casing and toroidally developed about said winding.

4. The impedance element of claim 3, in which said rings are resin-bonded to one another only at their edges.

5. The impedance element of claim 3, in which said rings rest upon one another but are otherwise free of one another.

6. A periodically varying signal filter comprising: an amplifying means responsive to the periodically varying signal; an impedance element comprising a plurality of thin, flat magnetostrictive rings coaxially stacked upon one another, the dimensions of said rings being circumferentially uniform, a rigid casing having a correspondingly ring-shaped inner space within which said stack of rings is received with clearance therearound, said rings being alike and each having a radial thickness several times greater than their axial thickness and many times greater than the radial clearance between said rings and said casing, and an electrical winding on said casing and toroidally developed about said winding, said winding being coupled to said amplifying means to control the amplification of the periodically varying signals.

7. The apparatus of claim 6, wherein said amplifying means is a triode vacuum tube having an anode, a cathode, and a control grid, said control grid receiving the periodically varying signal, and said impedance element being opertively disposed in the cathode circuit of said triode vacuum tube.

8. A band-reject filter, comprising: a trode vacuum tube, said triode vacuum tube having a control grid for receiving a periodically varying signal, an anode for transmitting the periodically varying signal, said anode being coupled via a resistor to a source of potential, and a cathode, an impedance element comprising a plurality of thin, flat magnetostrictive rings coaxially stacked upon one another, the dimensions of said rings being circumferentially uniform, a rigid casing having a correspondingly ring-shaped inner space within which said stack of rings is received with clearance therearound, said rings being alike and each having a radial thickness several times greater than their axial thickness and many times greater than the radial clearance between said rings and said casing, and an electrical winding on said casing and toroidally developed about said winding, said winding having a first and a second end, a resistor and capacitor disposed in parallel, one end of said winding being connected to the cathode of said triode vacuum tube and the other end of said winding being connected to the parallel combination of said resistor and capacitor such that when the frequency of the periodically varying signal approaches the mechanically resonant frequency of said stack of rings the periodically varying signal is not transmitted from the anode of said triode vacuum tube.

9. A band-pass filter, comprising a triode vacuum tube, said triode vacuum tube having a control grid for receiving a periodically varying signal, an anode coupled to a source of potential, and a cathode for transmitting the periodically varying signal, an impedance element comprising a plurality of thin, flat magnetostrictive rings coaxially stacked upon one another, the dimensions of said rings being circumferentially uniform, a rigid casing having a correspondingly ring-shaped inner space within which said stack of rings is received with clearance therearound, said rings being alike and each having a radial thickness several times greater than their axial thickness and many times greater than the radial clearance between said rings and said casing, and an electrical winding on said casing and toroidally developed about said winding, said winding having a first and a second end, and a parallel combination of a resistor and a capacitor, one end of said winding being connected to the cathode of said triode vacuum tube and the other end of said winding being connected to the parallel combination such that only periodically varying signals having frequencies approaching the mechanically resonant frequency of said stack of rings are transmitted.

10. Signal-transfer apparatus comprising a plurality of thin, flat, magnetostrictive rings coaxially stacked upon one another, the dimensions of said rings being circumferentially uniform, a rigid casing having a correspondingly ring-shaped inner space within which said stack of rings is received with clearance therearound, said rings being alike and each having a radial thickness several times greater than their axial thickness and many times greater than the radial clearance between said rings and said casing, and an electrical winding on said casing and toroidally developed about said winding, a source of a carrier signal, a varying amplitude signal source, said winding being responsive to both said sources, and an output means responsive to said stack of rings to transmit a periodically varying output signal with a frequency equal to the frequency of the carrier signal and an amplitude related to the amplitude of the varying-amplitude signal.

11. The apparatus of claim 10, wherein the frequency of the carrier signal is substantially equal to the mechanically resonant frequency of said stack.

12. The apparatus of claim 10, wherein said winding has a first and second end coupled respectively to a first and second terminal, a first series circuit coupled to said first and second terminals, said first series circuit including said varying amplitude signal source and low-pass filtering means, and a second series circuit coupled to said first and second terminals, said second series circuit including said source of carrier signal and a high-pass filtering means, said first and second terminals transmitting the output signal.

13. The apparatus of claim 10, including a detector means responsive to the output means to transmit a signal which is the amplification of the varying amplitude signal.

14. A bridge modulator, comprising an impedance bridge having four arms disposed to form a closed circuit, the first arm of said impedance bridge including an impedance element comprising a plurality of thin, flat magnetostrictive rings coaxially stacked upon one another, the dimensions of said rings being circumferentially uniform, a rigid casing having a correspondingly ring-shaped inner space within which said stack of rings is received with clearance therearound, said rings being alike and each having a radial thickness several times greater than their axial thickness and many times greater than the radial clearance between said rings and said casing and an electrical winding on said casing and toroidally developed about said winding, the second arm including an impedance element of given electrical characteristics, the third and fourth arms including impedance elements of given electrical characteristics, the junction of said first and fourth arms defining a first input terminal, the junction of said second and third arms defining a second input terminal, a series circuit coupled to said first and second input terminals, said series circuit including a varying amplitude signal source and a low-pass filter, a second series circuit coupled to said first and second input terminals, said second series circuit including a source of carrier signal and a high-pass filter, the junction of said first and second arms defining a first output terminal, and the junction of said third and fourth arms defining a second output terminal; whereby, upon excitation of said input terminals by said sources, said first and second output terminals transmit a signal with a frequency equal to the carrier frequency and an amplitude related to the varying amplitude signal.

15. The apparatus of claim 14, including detector means responsive to said first and second output terminals to transmit a signal which is the amplification of the varying amplitude signal.

References Cited in the file of this patent

UNITED STATES PATENTS

| | | |
|---|---|---|
| 2,550,771 | Camp | May 1, 1951 |
| 2,592,721 | Mott | Apr. 15, 1952 |
| 2,696,560 | Roberts | Dec. 7, 1954 |
| 2,736,824 | Roberts | Feb. 28, 1956 |
| 2,761,077 | Harris | Aug. 28, 1956 |
| 2,770,782 | Roberts | Nov. 13, 1956 |
| 2,834,943 | Grisdale | May 13, 1958 |